(12) United States Patent
Ochiai et al.

(10) Patent No.: US 11,404,691 B2
(45) Date of Patent: Aug. 2, 2022

(54) METHOD OF MANUFACTURING BATTERY ELECTRODE MATERIAL

(71) Applicant: FDK CORPORATION, Tokyo (JP)

(72) Inventors: Yuki Ochiai, Tokyo (JP); Maki Suzuki, Tokyo (JP); Daisuke Hirata, Tokyo (JP); Hiroshi Yanagi, Tokyo (JP)

(73) Assignee: FDK CORPORATION, Tokyo (JP)

( * ) Notice: Subject to any disclaimer, the term of this patent is extended or adjusted under 35 U.S.C. 154(b) by 0 days.

(21) Appl. No.: 17/024,693

(22) Filed: Sep. 18, 2020

(65) Prior Publication Data

US 2021/0005890 A1 Jan. 7, 2021

Related U.S. Application Data

(63) Continuation of application No. PCT/JP2019/002393, filed on Jan. 25, 2019.

(30) Foreign Application Priority Data

Mar. 22, 2018 (JP) .............................. JP2018-055148

(51) Int. Cl.
*H01M 4/50* (2010.01)
*C01G 45/02* (2006.01)
(Continued)

(52) U.S. Cl.
CPC .............. *H01M 4/50* (2013.01); *C01G 45/02* (2013.01); *H01M 4/0404* (2013.01); *H01M 4/62* (2013.01); *C01P 2006/40* (2013.01)

(58) Field of Classification Search
CPC ........ H01M 4/50; H01M 4/0404; H01M 4/62; H01M 4/621; H01M 4/1391;
(Continued)

(56) References Cited

U.S. PATENT DOCUMENTS 5,698,176 A * 12/1997 Capparella .............. H01M 4/50
423/605
2014/0298645 A1* 10/2014 Aouad .................... H01M 4/75
29/623.1

FOREIGN PATENT DOCUMENTS

JP H59-175563 A 10/1984
JP H10-199517 A 7/1998
(Continued)

OTHER PUBLICATIONS

International Search Report (ISR) for Application No. PCT/JP2019/002393 dated Apr. 2, 2019.
(Continued)

*Primary Examiner* — Andrew J. Oyer
(74) *Attorney, Agent, or Firm* — Isshiki & Partners; Joseph P. Farrar, Esq.

(57) ABSTRACT

A method of manufacturing a battery electrode material in slurry form to be coated on a sheet-shaped current collector, the battery electrode material containing an electrode active material made of electrolytic manganese dioxide (EMD) and containing an aqueous binder. The method includes, as a process of mixing and kneading raw materials of the battery electrode material by using water as a solvent, mixing the electrode active material; mixing the binder; and mixing a neutralizing agent, the neutralizing agent being lithium hydroxide (LiOH).

2 Claims, 7 Drawing Sheets

(51) Int. Cl.
*H01M 4/04* (2006.01)
*H01M 4/62* (2006.01)

(58) Field of Classification Search
CPC ........... H01M 4/0402; H01M 10/0585; C01G 45/02; C01P 2006/40; Y02E 60/10
See application file for complete search history.

(56) References Cited

FOREIGN PATENT DOCUMENTS

| | | |
|---|---|---|
| JP | H1 1-506721 A | 6/1999 |
| JP | 2013-182843 A1 | 9/2013 |
| JP | 2016-514892 A | 5/2016 |
| JP | 2017-098012 A | 6/2017 |
| WO | 2018/179935 A1 | 10/2018 |

OTHER PUBLICATIONS

English Translation of the ISR for Application No. PCT/JP2019/002393 dated Apr. 2, 2019.
Written Opinion of the International Search Authority for Application No. PCT/JP2019/002393 dated Apr. 2, 2019.
Partial translation of Written Opinion of the International Search Authority for Application No. PCT/JP2019/002393 dated Apr. 2, 2019.

* cited by examiner

METHOD OF MANUFACTURING BATTERY ELECTRODE MATERIAL

CROSS-REFERENCE TO RELATED APPLICATIONS

This is a continuation application of International Patent Application No. PCT/JP2019/002393 filed Jan. 25, 2019, which claims the benefit of priority to Japanese Patent Application No. 2018-055148 filed Mar. 22, 2018, the entire contents of each of which are hereby incorporated herein by reference.

BACKGROUND

Technical Field

The present disclosure relates to a method of manufacturing a battery electrode material.

Description of the Related Art

Some electrode materials used for producing battery electrodes take the form of a slurry. Examples of the slurry electrode materials include positive electrode materials for spiral lithium primary batteries and laminated lithium primary batteries. Such a slurry electrode material is produced by kneading a mixture of a powdered electrode active material, a conductive auxiliary agent, a binder, and, if necessary, a thickener or the like, while being subjected to shear stress by using a planetary mixer or the like. Japanese Patent Application Publication No. 2017-98012 describes the following lithium battery, which includes an electrode plate formed by coating a flat-plate current collector with slurry electrode material.

Figure 1A:
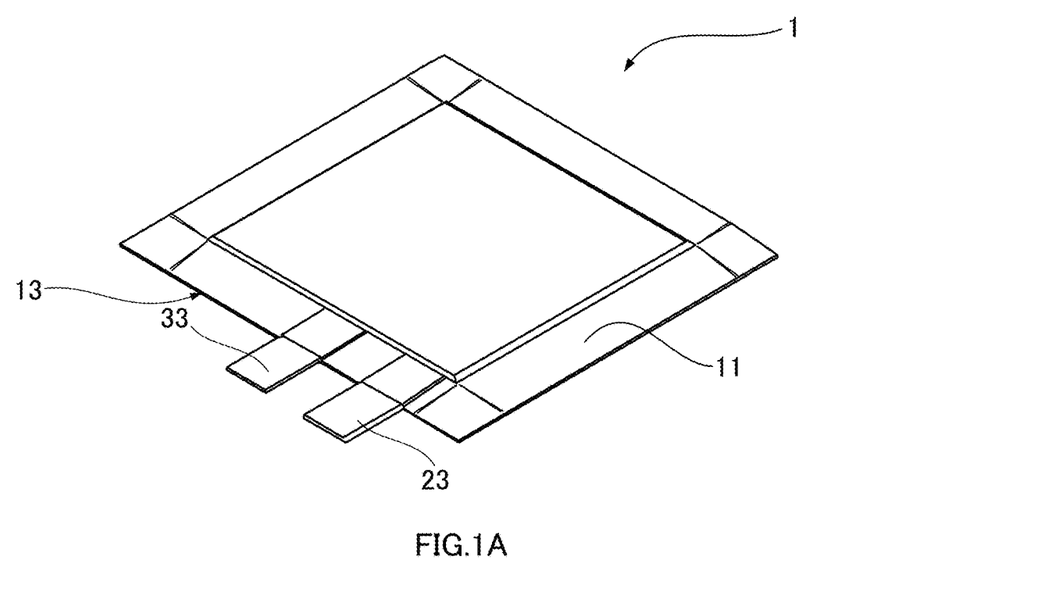
FIG. 1A is a diagram illustrating a structure of a laminated power storage element which is an example of a battery including an electrode plate using a slurry electrode material.
Figure 1B:
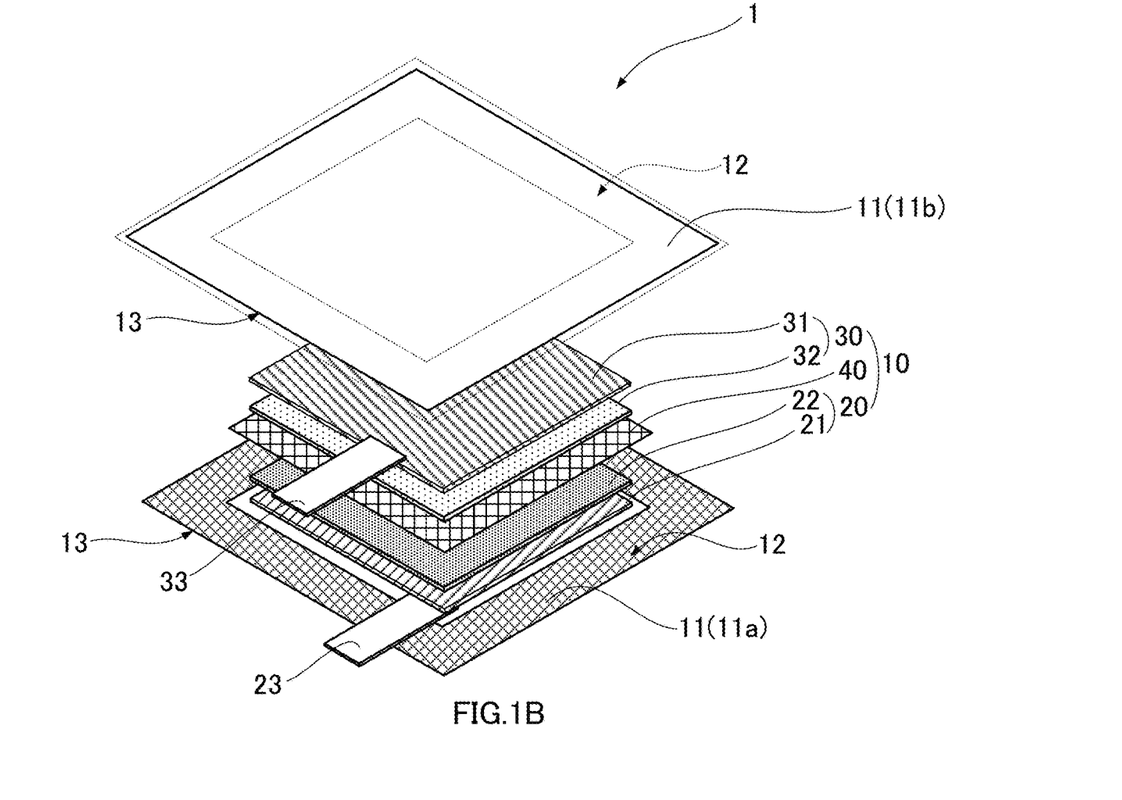
FIG. 1B is a diagram illustrating a structure of a laminated power storage element which is an example of a battery including an electrode plate using a slurry electrode material.

FIGS. 1A and 1B illustrate a laminated power storage element 1 that represents an example of the battery produced by using the slurry electrode material. FIG. 1A is an external view of the laminated power storage element 1, and FIG. 1B is an exploded perspective view illustrating an outline of an internal structure of the power storage element 1. The laminated power storage element 1 has a flat-plate external shape as illustrated in FIG. 1A, in which electricity generating elements are sealed in an exterior body 11 that is formed into a flat rectangular bag by using aluminum laminate films 11a and 11b. Meanwhile, in the laminated power storage element 1 illustrated therein, a positive electrode terminal plate 23 and a negative electrode terminal plate 33 are led out from one side 13 of the rectangular exterior body 11.

Next, a structure of the laminated power storage element 1 will be described with reference to FIG. 1B. Note that some of components and regions in FIG. 1B are provided with hatching so as to be distinguishable from other components or regions. As illustrated in FIG. 1B, the exterior body 11 is configured such that peripheral regions 12, which are hatched or indicated with a dotted-line frame in FIG. 1B, of the two rectangular aluminum laminate films (11a and 11b) laminated to each other, are welded by thermal compression bonding to seal the inside thereof.

The exterior body 11 encloses therein an electrode body 10 together with an electrolyte solution. The electrode body 10 is formed such that a sheet-shaped positive electrode plate 20 and a sheet-shaped negative electrode plate 30 are laminated via a separator 40. The positive electrode plate 20 is formed such that a slurry positive electrode material 22 containing a positive electrode active material is coated onto one of principal surfaces of a sheet-shaped positive electrode current collector 21 made of a metal foil or the like, and is dried. A positive electrode terminal plate 23 is coupled to the positive electrode current collector 21. One end of the positive electrode terminal plate 23 is exposed to the outside of the exterior body 11, while the other end thereof is coupled to part of the positive electrode current collector 21 by ultrasonic welding or the like. The positive electrode material 22 is coated on the surface of the positive electrode current collector 21 facing the separator 40. When the laminated power storage element 1 is a lithium primary battery, it is possible to employ manganese dioxide or the like as the positive electrode active material.

The negative electrode plate 30 is formed such that a negative electrode material 32 containing a negative electrode active material is disposed on one of principal surfaces of a sheet-shaped negative electrode current collector 31 made of a metal plate, a metal foil, or the like. As with the positive electrode current collector 21, a negative electrode terminal plate 33 is coupled to the negative electrode current collector 31, and one end of the negative electrode terminal plate 33 is exposed to the outside of the exterior body 11. The negative electrode material 32 may be formed such that a slurry material containing a negative electrode active material is coated and dried. Alternatively, when the laminated power storage element 1 is a lithium primary battery, the negative electrode material 32 may be a negative electrode active material itself made of metallic lithium or a lithium metal. Then, the electrode material 22 of the positive electrode plate 20 and the electrode material 32 of the negative electrode plate 30 face each other via the separator 40. As such, a laminated power storage element includes electrode plates each formed such that a slurry electrode material is coated on a sheet-shaped current collector made of a metal foil or a metal plate.

As described above, the slurry electrode material is prepared such that the mixture of the powdered electrode active material, the conductive auxiliary agent, and the binder is kneaded using a solvent. When the electrode plate is produced, the slurry electrode material is coated on the sheet-shaped current collector by using a squeegee and/or the like. Here, the binder to be mixed in the slurry electrode material includes an aqueous binder that uses water as a solvent, and a solvent based binder that uses an organic solvent. Styrene-butadiene rubber (SBR) has been well known as such an aqueous binder. On the other hand, examples of the solvent based binder include polyvinylidene difluoride (PVDF) and the like.

Meanwhile, with a rise in social awareness of environment in recent years, there has been a growing demand for adopting the aqueous binder that has less harmful to the environment as the binder used for the battery electrode material. However, electrolytic manganese dioxide (hereinafter also referred to as EMD) serving as a positive electrode active material for lithium primary batteries is manufactured through a cleaning process that uses sulfuric acid. Thus, the use of the aqueous binder in the electrode material using EMD as the positive electrode active material results in the binder itself being decomposed. Then, the electrode material may develop cohesion or increase in viscosity, thereby making it difficult to produce the slurry electrode material suitable for coating. If a large amount of the aqueous binder is contained in the electrode material to compensate for a loss resulting from the decomposed aqueous binder, the amount of the binder which does not contribute to a discharge reaction will relatively increase, resulting in a deterioration of a discharge performance of the battery. If the electrode material is diluted with a large amount of water to reduce acidity of the electrode material, it will take quite a long time for drying the coated electrode material. A large amount of energy is also needed for heating. As a consequence, manufacturing costs of the battery will be increased.

SUMMARY

Accordingly, an object of the present disclosure is to provide a method of manufacturing a slurry battery electrode material having excellent coatability without increasing manufacturing costs, while using an aqueous binder and an electrode active material made of EMD.

A primary aspect of the present disclosure for achieving an object described above is a method of manufacturing a battery electrode material in slurry form to be coated on a sheet-shaped current collector, the battery electrode material containing an electrode active material made of electrolytic manganese dioxide (EMD) and containing an aqueous binder, the method comprising: as a process of mixing and kneading raw materials of the battery electrode material by using water as a solvent, mixing the electrode active material; mixing the binder; and mixing a neutralizing agent, the neutralizing agent being lithium hydroxide (LiOH).

In addition, the method of manufacturing a battery electrode material is preferably characterized in that the method is executed in order of the mixing the electrode active material, the mixing the neutralizing agent, and the mixing the binder. A pH value of the battery electrode material may be adjusted to 6.5 or more and 9 or less by the mixing the neutralizing agent.

According to a method of manufacturing a battery electrode material according to the present disclosure, it is possible to manufacture a slurry battery electrode material having excellent coatability without increasing manufacturing costs, while using an aqueous binder and an electrode active material made of EMD. Other advantageous effects of the present disclosure will become apparent from the following descriptions.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Referring now to the drawings, wherein like reference numerals designate identical or corresponding parts throughout the several views thereof, a method of manufacturing a battery electrode material according to embodiments of the present disclosure are described. As used herein, the singular forms "a", "an", and "the" are intended to include the plural forms as well, unless the context clearly indicates otherwise.

Embodiment

A method of manufacturing an electrode material according to an embodiment of the present disclosure includes a process of kneading a mixture of a powdered electrode active material made of EMD, a powdered conductive auxiliary agent, a binder, and a thickener. In the kneading process, the electrode material that is acidic containing EMD while being subjected to kneading is neutralized with lithium hydroxide (LiOH). This makes it possible to obtain an electrode material having excellent coatability without increasing the amount of the binder or diluting the electrode material with a large amount of water.

Procedure of Producing Electrode Material

Figure 2:
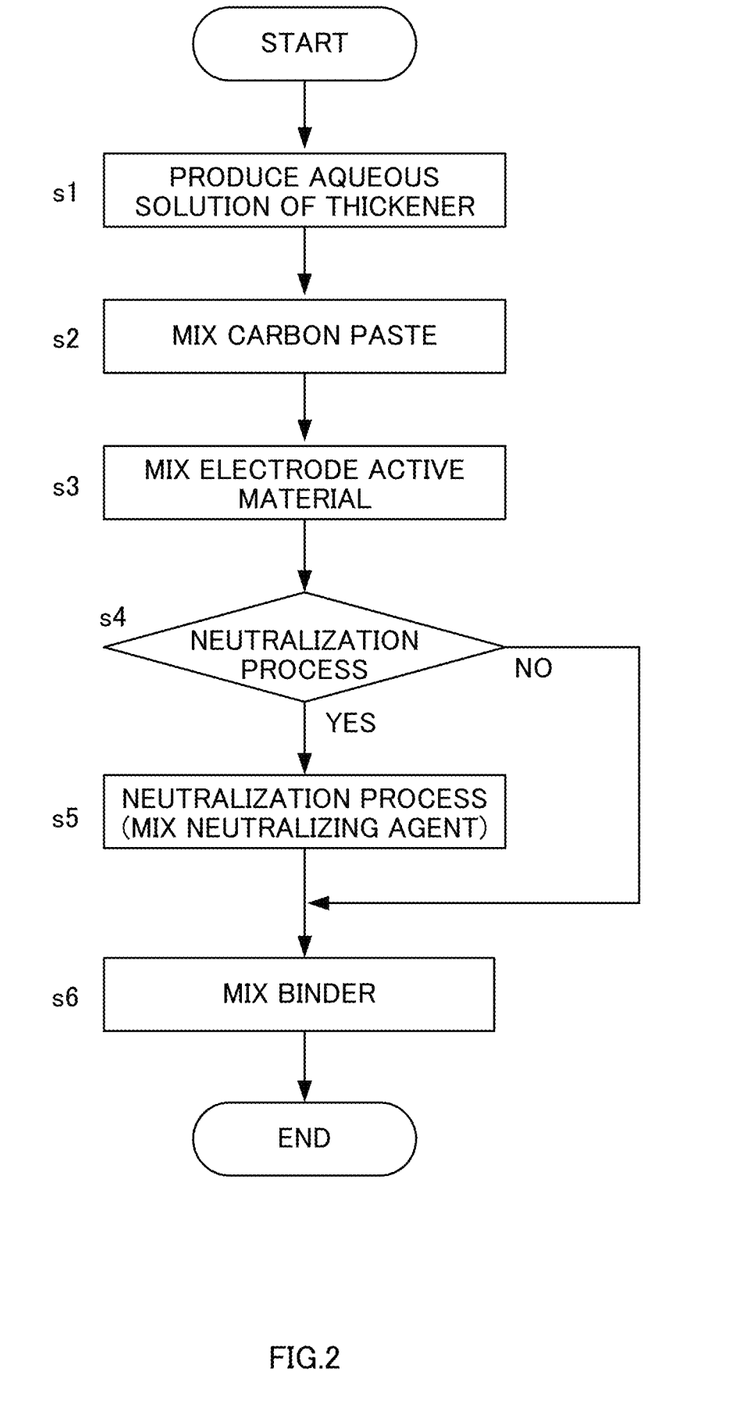
FIG. 2 is a diagram illustrating a procedure of a method of manufacturing a battery electrode material according to an embodiment of the present disclosure.

In order to evaluate the characteristics, such as coatability, of an electrode material produced by the method according to an embodiment of the present disclosure, various electrode materials were produced as samples while varying manufacturing conditions, such as the presence or absence of a neutralization process and the type of a neutralizing agent used. The procedure of manufacturing a sample is illustrated in FIG. 2. First, a slurry thickener (such as carboxymethyl cellulose) is mixed with purified water serving as a diluent (s1), and this mixture is kneaded by using a planetary mixer. Next, this mixture is further kneaded while adding a conductive auxiliary agent (such as acetylene black) thereto (s2). Then, EMD serving as an electrode active material is put into the planetary mixer and the mixture is further kneaded (s3). After putting EMD into the planetary mixer, a neutralizing agent corresponding to each sample is put therein and a pH value of the material in the kneading process (hereinafter also referred to as a kneaded material) is adjusted (s4 to s5). A corresponding one of aqueous solutions of LiOH, NaOH, KOH, and $NH_3$ was used as the neutralizing agent for each of the samples. Meanwhile, in the neutralization process (s5), the pH value of the kneaded material is adjusted in a range of pH 7±0.5 with respect to the pH 7 that represents neutrality. Note that the pH value of the kneaded material before being subjected to the neutralization process (s5) is in a range from 3 to 5. Then, the aqueous binder (such as SBR) and purified water serving as a solvent are added to the kneaded material having been subjected to the neutralization process (s5) and the mixture is further kneaded. Accordingly, each sample of the slurry electrode material was obtained (s6). Here, proportions of the electrode active material, the conductive auxiliary agent, and the binder can be set to 93 wt %, 3 wt %, and 4 wt %, for example.

Characteristics Evaluation

Coatability

Figure 3A:
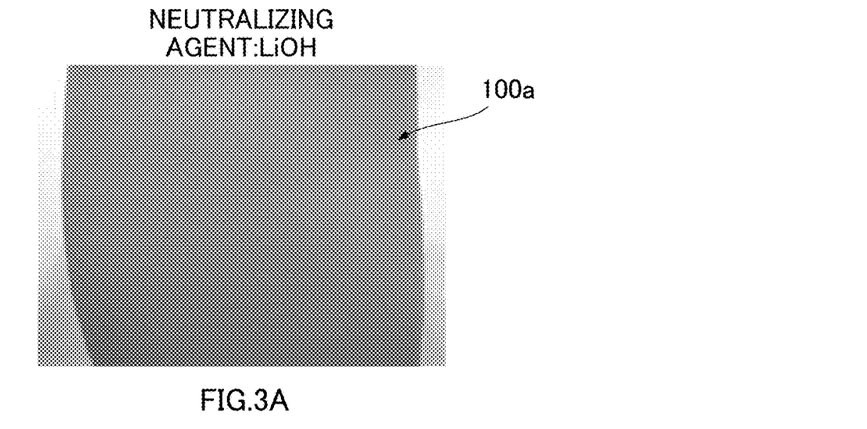
FIG. 3A is a diagram illustrating a state where a battery electrode material is coated.
Figure 3B:
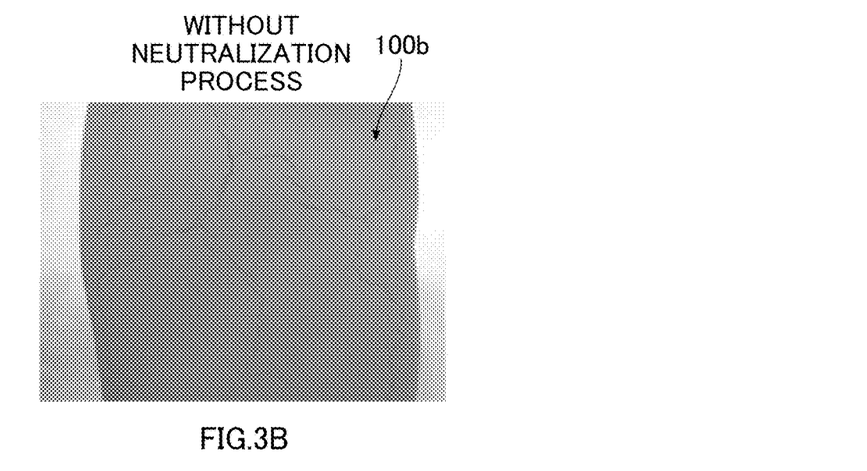
FIG. 3B is a diagram illustrating a state where a battery electrode material is coated.
Figure 3C:
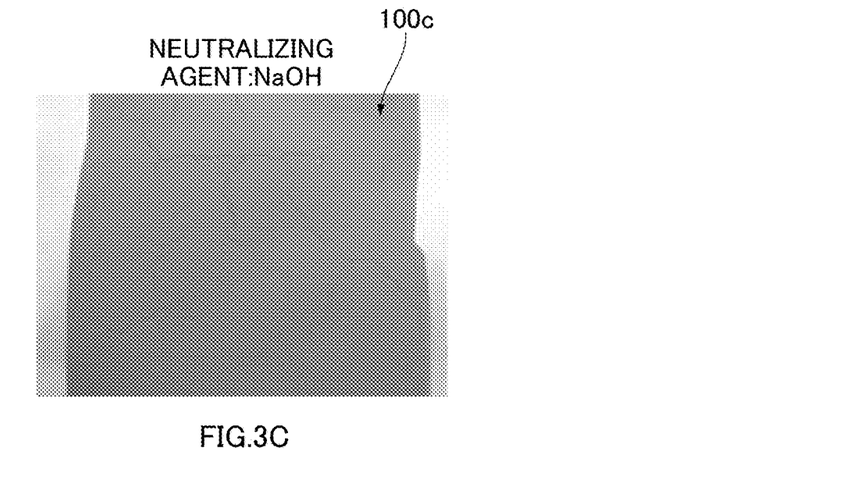
FIG. 3C is a diagram illustrating a state where a battery electrode material is coated.
Figure 3D:
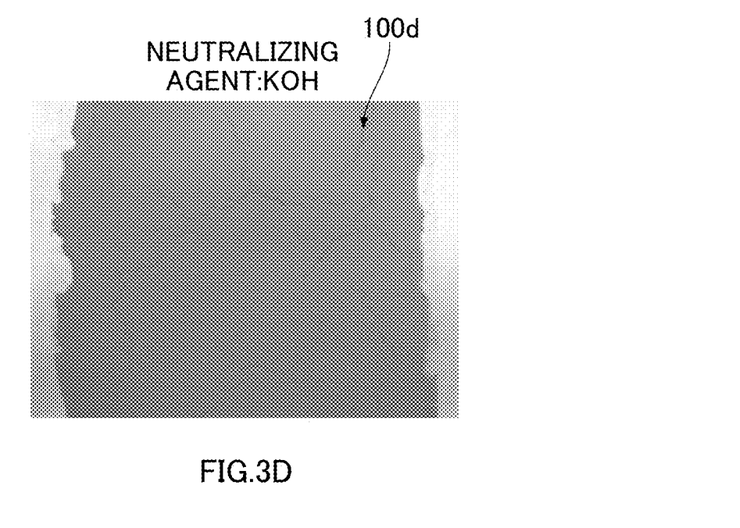
FIG. 3D is a diagram illustrating a state where a battery electrode material is coated.
Figure 3E:
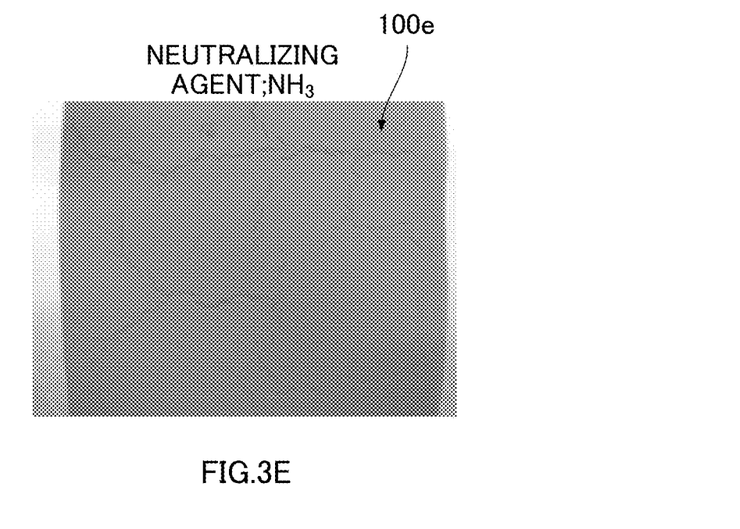
FIG. 3E is a diagram illustrating a state where a battery electrode material is coated.

The samples produced as described above are first subjected to quality evaluation in terms of coatability. Here, each of the samples is coated on a PET film with a thickness of 200 μm, and then the sample is placed in a constant temperature bath at a temperature of 80° C. for 20 minutes to be dried. Then, coated surfaces are visually observed. FIGS. 3A to 3E are photographs showing the coated surfaces of the respective samples. As illustrated in FIG. 3A, the sample produced by using LiOH as the neutralizing agent has a smooth coated surface 100a and no flaws such as cracks can be observed thereon. On the other hand, as illustrated in FIGS. 3B to 3E, cracks were generated on a coated surface 100b of the sample not subjected to the neutralization process, a coated surface 100c of the sample using NaOH as the neutralizing agent, a coated surface 100d of the sample using KOH as the neutralizing agent, and a coated surface 100e of the sample using $NH_3$ as the neutralizing agent, respectively.

In the laminated power storage element 1 illustrated in FIGS. 1A and 1B, a coating thickness of the electrode material (positive electrode material 22) in the electrode plate (positive electrode plate 20) is about 20 μm. On the other hand, a coating thickness of the electrode material produced by the manufacturing method according to an embodiment of the present disclosure is set to 200 μm assuming that a battery capacity is further increased. Accordingly, a large stress in a direction of contraction in a plane direction is applied to the electrode material of each sample coated on a flat surface in the course of a drying process. In other words, the samples illustrated in FIGS. 3A to 3E were coated under the condition that defects such as cracks are likely to occur. Meanwhile, the sample that uses LiOH as the neutralizing agent can restrain decomposition of the binder by reducing acidity of the electrode material, to thereby improve coatability. Moreover, unlike the samples using other neutralizing agents, the sample that uses LiOH as the neutralizing agent does not develop cracks or the like on the coated surface after drying even when the electrode material is coated thicker. In other words, the electrode material produced by using LiOH as the neutralizing agent has high flexibility even after drying. Accordingly, the electrode material produced by using LiOH as the neutralizing agent also contributes to increase in capacity of the battery.

Peel Strength

Next, an electrode (hereinafter also referred to as an electrode according to an embodiment of the present disclosure) in a state of being actually embeddable in a battery is produced such that the sample using LiOH as the neutralizing agent (hereinafter also referred to as an electrode material according to an embodiment of the present disclosure) is coated on a current collector, and then peel strength of the electrode material according to an embodiment of the present disclosure is measured. Here, firstly, the electrode material according to an embodiment of the present disclosure is coated, with a thickness of 200 μm, on the current collector made of a stainless steel foil having a thickness of 20 μm. Then, this one obtained by applying the electrode material according to an embodiment of the present disclosure on the rectangular current collector is dried in the constant temperature bath under conditions of a temperature of 80° C. and a time period of 30 minutes, thereby obtaining the electrode according to an embodiment of the present disclosure to be measured in terms of peel strength thereof. Meanwhile, for the purpose of comparison with the electrode material according to an embodiment of the present disclosure, an electrode (hereinafter also referred to as an electrode according to a comparative example) is also obtained by coating the current collector with a sample produced without being subjected to the neutralization process (hereinafter referred to as an electrode material according to a comparative example), with the same thickness as in an embodiment of the present disclosure, and drying it under the same conditions as in an embodiment of the present disclosure.

Figure 4:
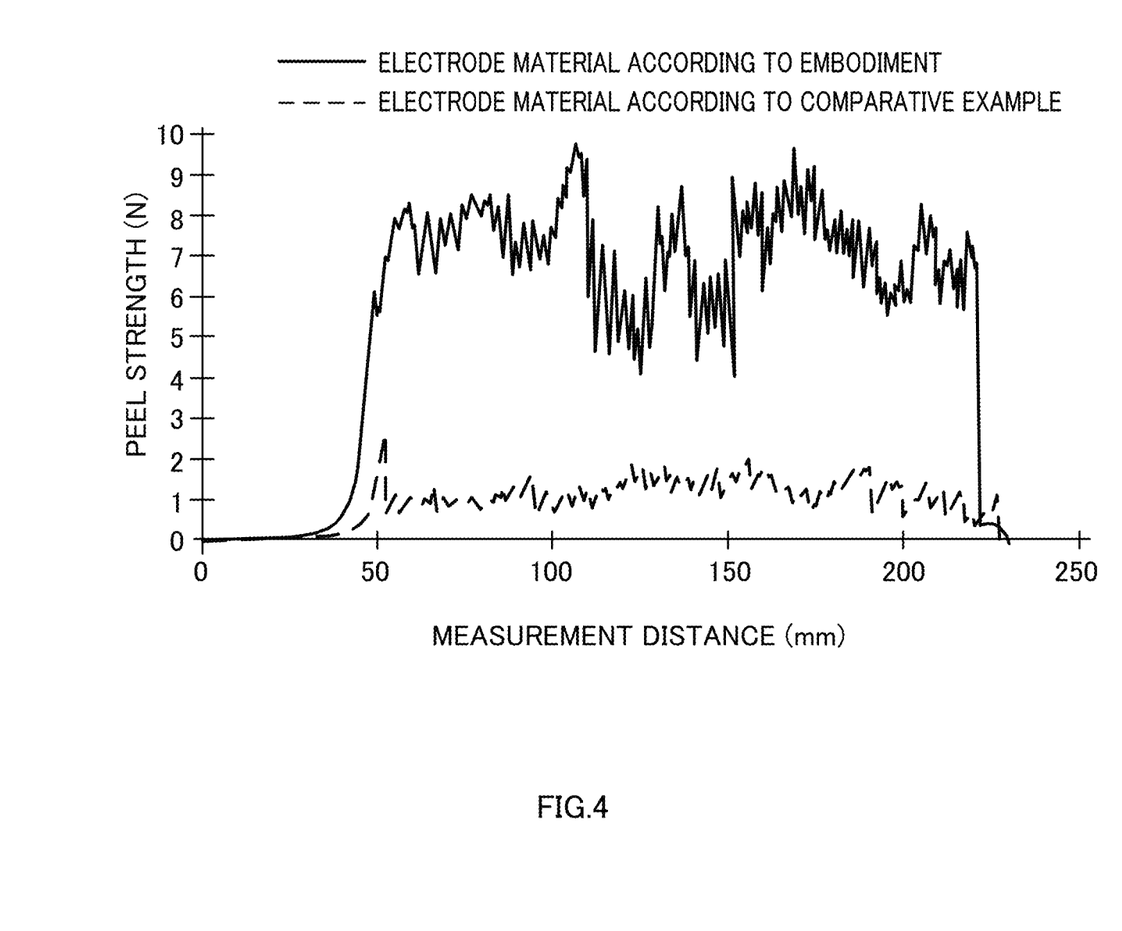
FIG. 4 is a graph illustrating peel strength of battery electrode materials each coated on a current collector.

Here, the peel strength was measured by conducting a 90-degree tensile test in compliance with the JIS 6854 standard. In the meantime, the pH value of the electrode material according to an embodiment of the present disclosure was 7.39 and the pH value of the electrode material according to the comparative example was 4.20. FIG. 4 illustrates measurement results of peel strengths of the electrode material according to an embodiment of the present disclosure and the electrode material according to the comparative example.

In FIG. 4, a distance from a given reference position determined at the time of measurement as appropriate to a peel position of the electrode material on the rectangular current collector is defined as a measurement distance. Moreover, in FIG. 4, a side of the current collector on one side is located at a position corresponding to the measurement distance of about 50 mm, while a side of the current collector on the other side is located at a position corresponding to the measurement distance of about 230 mm, and a range from the one side to the other side corresponds to a region between the sides of the current collector. As illustrated in FIG. 4, the electrode material according to an embodiment of the present disclosure had a tensile strength of 8 N or more when started peeling off at the position of the one side. On the other hand, the electrode material according to the comparative example peeled off at a tensile strength of 3 N or less.

Meanwhile, the electrode material had more than 5 times as great as the peel strength of the electrode material according to the comparative example, across the entire measurement region from the position of the one side, at which the electrode material according to an embodiment of the present disclosure started peeling off, toward the other side. Specifically, it is confirmed that the electrode material according to an embodiment of the present disclosure have a sufficiently great peel strength even when coated on the current collector with a thickness of 200 μm. Moreover, when the electrode material according to an embodiment of the present disclosure is used for the positive electrode material 22 in the laminated power storage element 1 illustrated in FIG. 1, for example, the positive electrode material 22 is not likely to peel off from the current collector 21 even when the positive electrode plate 20 is bent in the interior of the exterior body 11 due to an external force. In addition, when the electrode plate according to an embodiment of the present disclosure is employed in a spiral battery, the electrode material according to an embodiment of the present disclosure is not likely to peel off from the current collector against a stress caused by winding the electrode plate.

Viscosity Stability

In the meantime, in an actual battery manufacturing site, batteries are assembled by using the electrode materials produced in advance. In other words, a large amount of the electrode materials is produced and stored in advance. Therefore, even if the electrode materials have fine characteristics immediately after their production, it is difficult to use the electrode materials for actual batteries if a temporal change in viscosity takes place.

Figure 5:
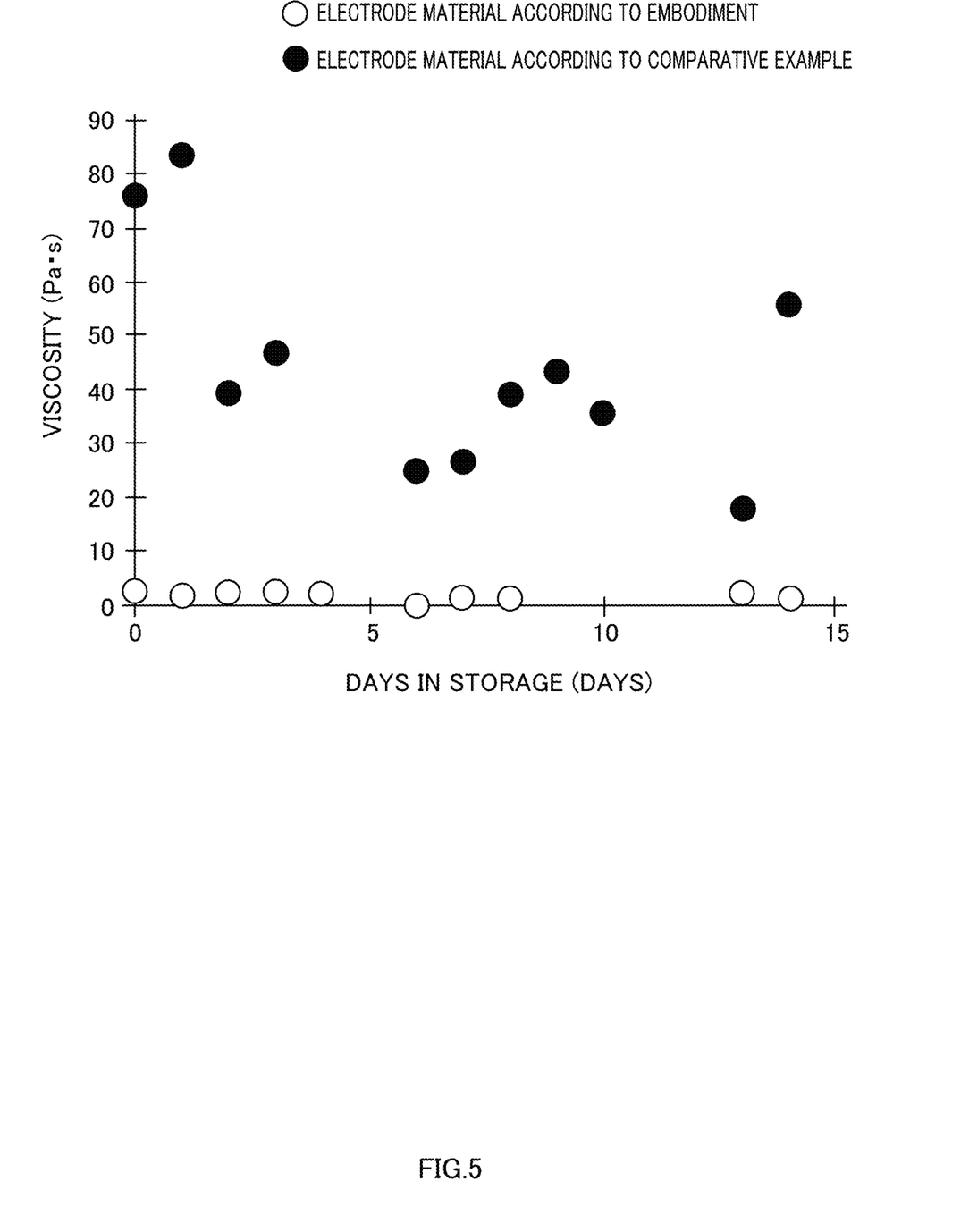
FIG. 5 is a graph illustrating temporal changes in viscosity of battery electrode materials.
Figure 6:
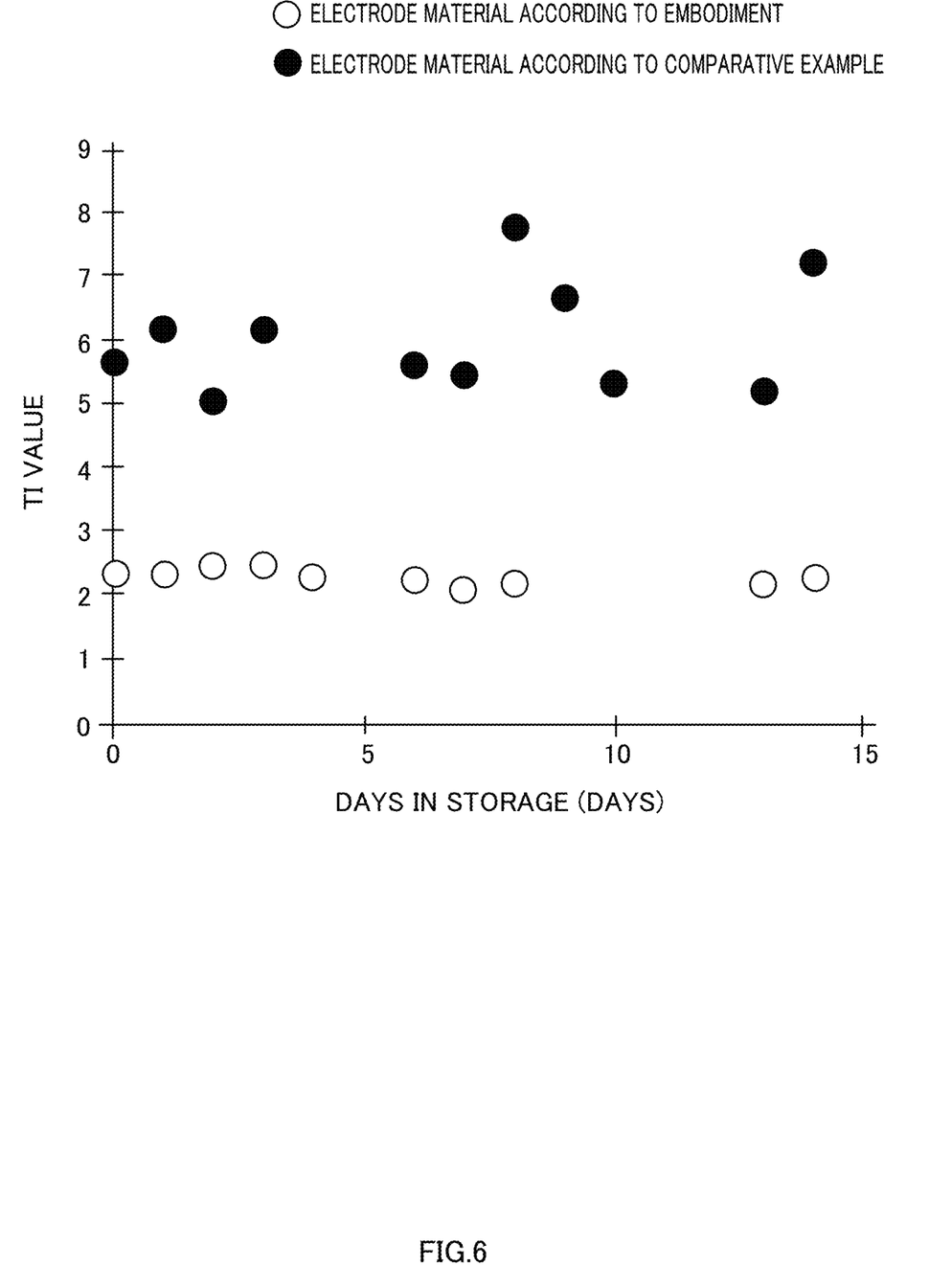
FIG. 6 is a graph illustrating temporal changes in TI value of battery electrode materials.

Then, the electrode material according to an embodiment of the present disclosure and the electrode material according to the comparative example are examined next in terms of temporal change in viscosity. To be more specific, each electrode material is placed in an airtight ointment container and stored for fourteen days at room temperature. During this period, the viscosity of each electrode material was measured at appropriate time points by using a dynamic viscoelasticity measurement device (rheometer), to obtain a TI value (10/1) in the storage period. The TI value is an index value that represents a degree of cohesion in a material that is to be kneaded under shear stress by using a planetary mixer or the like. The higher the cohesive property is, the higher the TI value becomes. For example, when the electrode material is kneaded under shear stress at a low shear rate D, resistance increases without loosening an aggregate, to thereby increase the viscosity. On the other hand, when the electrode material is kneaded under shear stress at a high shear rate D, the aggregate also moves and exhibits a high fluidity, to thereby decrease the viscosity. As described above, the TI value is the index that represents variability of the viscosity with the shear rate D. A lower TI value represents that the aggregate is more likely to be loosened and uniformly dispersed. FIG. 5 illustrates temporal changes in the viscosity of the electrode materials. FIG. 5 illustrates the viscosities at a given shear rate D (such as D=1 (1/s)). FIG. 6 illustrates temporal changes in TI value. FIG. 6 illustrates the TI values (10/1) based on the viscosities in a case where the shear rate D is 0.1 (1/s) and in a case where the shear rate D is 1 (1/s), for example.

As illustrated in FIG. 5, the electrode material according to an embodiment of the present disclosure retains constant low viscosities during the storage period. On the other hand, the electrode material according to the comparative example has unstable high viscosities. Meanwhile, as illustrated in FIG. 6, the electrode material according to an embodiment of the present disclosure retains constant low TI values during the storage period. On the other hand, the electrode material according to the comparative example has unstable high TI values. Accordingly, it can be confirmed that the electrode material according to an embodiment of the present disclosure maintains the state of low viscosity and less cohesion throughout the storage period.

OTHER EMBODIMENTS

In the method of manufacturing a battery electrode material according to an embodiment of the preset disclosure described above, the raw materials of the electrode material are sequentially mixed while being kneaded, using water as a solvent. Moreover, after putting the electrode active material into the kneaded material, the neutralizing agent is put therein, and then the binder is added therein. In other words, the decomposition of the binder is reliably restrained by neutralizing the kneaded material in the state of high acidity before putting the binder into the kneaded material. Of course, even if, after the electrode active material is put in the kneaded material, the binder is put therein and then the neutralizing agent is added therein, it is also possible to neutralize the kneaded material before the decomposition of the binder progresses, as long as intervals between these procedures are shortened.

In the method of manufacturing a battery electrode material according to an embodiment of the present disclosure, the pH value of the electrode material is adjusted in the range of about 7±0.5 (6.5≤pH value≤7.5) by the neutralization process. However, the neutralization process only needs to reduce the acidity to about such an extent that the binder will not be decomposed. In the meantime, the binder will not be decomposed in an alkaline kneaded material. Accordingly, there is no specific upper limit of the pH value in terms of the binder. Nevertheless, in a case where the electrode material is strongly alkaline and coated on the current collector made of a metal, the metal may be corroded. In general, such a corrosion is prone to occur when the pH value is greater than 9. Accordingly, the pH value is preferably set equal to or smaller than 9. Thus, it is more preferable to adjust the pH value of the electrode material in a range of 6.5≤pH value≤9.0 by the neutralization process.

The electrode material produced by the method according to an embodiment of the present disclosure only needs to be slurry containing EMD as the electrode active material. The batteries to which this electrode material is applied are not limited to the laminated and spiral lithium primary batteries. The electrode material according to an embodiment of the present disclosure is also applicable to any battery that includes an electrode plate structured such that a slurry electrode material is coated on a sheet-shaped current collector such as a metal foil, regardless of whether the battery is a primary battery or a secondary battery.

Embodiments of the present disclosure described above are simply for facilitating the understanding of the present disclosure and are not in any way to be construed as limiting the present disclosure. The present disclosure may variously be changed or altered without departing from its scope and encompass equivalents thereof.

What is claimed is:

1. A method of manufacturing a battery electrode material in slurry form to be coated on a sheet-shaped current collector, the battery electrode material containing an electrode active material made of electrolytic manganese dioxide (EMD) and containing an aqueous binder, the method comprising:
   a first step of adding water to a thickener slurry and mixing to produce a first mixture;
   a second step of adding conductive auxiliary agent to the first mixture and kneading to produce a second mixture;
   a third step of adding electrode active material to the second mixture and kneading to produce a third mixture;
   a fourth step of adding lithium hydroxide (LiOH) to the third mixture and neutralizing to produce a fourth mixture; and
   a fifth step of adding the aqueous binder and water as a solvent to the fourth mixture and mixing to produce a fifth mixture.

2. The method of manufacturing a battery electrode material according to claim 1,
   wherein a pH value of the battery electrode material is adjusted to between 6.5 or more and 9 or less in the fourth step.

* * * * *